G. W. NORDSTRUM.
BALL BEARING AND METHOD OF ASSEMBLING SAME.
APPLICATION FILED DEC. 11, 1917.
1,280,075.
Patented Sept. 24, 1918.
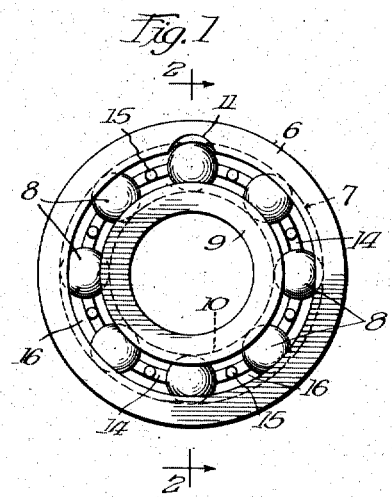
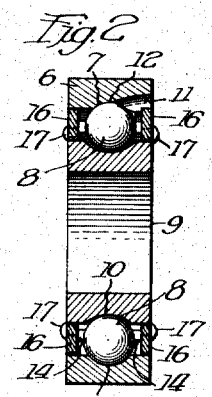
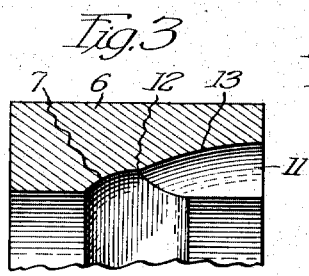
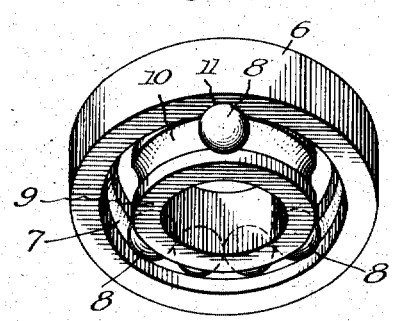
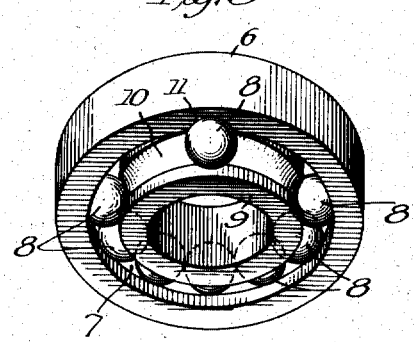
Witness:
Leonard W. Novander.
Inventor
George W. Nordstrum
By Pond + Wilson
Attys

UNITED STATES PATENT OFFICE.

GEORGE W. NORDSTRUM, OF CHICAGO, ILLINOIS.

BALL-BEARING AND METHOD OF ASSEMBLING SAME.

1,280,075.  Specification of Letters Patent.  Patented Sept. 24, 1918.

Application filed December 11, 1917. Serial No. 206,626.

*To all whom it may concern:*

Be it known that I, GEORGE W. NORDSTRUM, a citizen of the United States, residing at Chicago, in the county of Cook and State of Illinois, have invented certain new and useful Improvements in Ball-Bearings and Methods of Assembling Same, of which the following is a specification.

This invention relates to ball-bearings, and more particularly to that type wherein a circular row of balls, separated by spacers, travels in grooves formed on the inner and outer peripheries of a pair of concentric rings. The principal objects of the invention are to provide a construction employing integral or one-piece rings wherein it shall be possible to increase the number of balls that may be used in given sizes and proportions of balls and rings over the number heretofore possible under the so-called eccentric method of assembling illustrated in Letters Patent to Conrad, No. 838,303, dated Dec. 11, 1906; to provide an improved unitary structure wherein the parts hold each other together against lateral strains; to provide an improved and simple method of assembling the parts; and generally to improve the structure, durability, reliability and anti-friction qualities of ball bearings of this general type.

Other objects and advantages of the invention will be apparent to those skilled in the art from the following detailed description, taken in connection with the accompanying drawing wherein I have illustrated one practical and workable embodiment of the invention, and also my new and improved method of assembling the parts, and wherein—

Figure 1 is a face view of an assembled bearing, with the spacer ring nearest the observer omitted;

Fig. 2 is a diametric section on the line 2—2 of Fig. 1, and including the spacer ring that is omitted in Fig. 1;

Fig. 3 is an enlarged transverse section of a portion of the outer ring on the central longitudinal line of the notch of the latter; and Figs 4 and 5 are perspective views illustrating the method of assembling.

Referring to the drawing, 6 designates the outer ring that is formed on its inner periphery with a groove or raceway 7 for a series of steel balls 8, and 9 designates the inner ring that is formed on its outer periphery with a similar groove or raceway 10 for the balls 8. The groove 10 of the inner ring 9 is continuous or uninterrupted throughout its full height and circumference, and one side of the groove 7 of the outer ring 6 is likewise continuous or uninterrupted throughout its full height and circumference, while the opposite side of said groove 7 has formed therein a transverse notch 11 that extends from the face of the ring into the groove 7. The notch 11 has a transverse curvature conforming to the curvature of the balls 8, and preferably, and as herein shown, the inner end of this notch extends to the extreme bottom of the groove 7, as shown at 12 in Fig. 3, this point lying in the longitudinal median line of the groove. Furthermore, the notch is of such a depth that it will serve to admit a ball between the rings when the groove of the inner ring lies opposite the outer end and open side of the notch, as illustrated in Figs. 4 and 5. It will further be noted by reference to Fig. 3 that the longitudinal median line of the wall of the notch, indicated at 13, is slightly curved, or, in other words, the notch is slightly concave from end to end.

While, with the structure described, it is possible to introduce and use a limited number of balls by the eccentric method hereinbefore referred to, I have devised and preferably employ a different method of assembling which, with given sizes and relative dimensions of rings and balls, enables a greater number of balls to be used than is possible with the eccentric method of assembling. According to my improved method I first place several of the balls—four for instance—in that part of the groove 7 of the outer ring that lies opposite the notch 11. The inner ring 9 is then placed on said balls in a position substantially concentric with the outer ring, and its upper end is then tilted forwardly bringing the groove 10 opposite the outer or entrance end of the notch 11. Another ball is then placed between the groove 10 and the notch 11, as shown in Fig. 4, whereupon the inner ring is tilted back into the plane of the outer ring, and the ball is pushed down one side or the other until it strikes one of the end balls of the row in the lower portion of the groove 7. The inner ring is then tilted forwardly again, and another ball introduced in the same way until all of the balls have been entered. The inner ring can be tilted in this manner so long as the balls previously introduced do not fill more than the lower half of the circumference of the ball grooves or trackways. Fig. 5 shows the last ball of the series being entered through the notch 11, the previously entered balls filling substantially the lower half of the grooves.

After all the balls have been entered, any suitable means may be applied for uniformly spacing the balls throughout the circumference of the grooves. For this purpose I show a series of spacers 14 that lie between adjacent balls and are formed at their ends with pintles 15 that pass through holes in a pair of rings 16 and are riveted over at their ends as shown at 17. When the balls are thus uniformly spaced, it is impossible for the inner ring to tilt relatively to the outer ring under side thrusts, and consequently impossible for any of the balls to escape while traveling past the notch 11.

Variations in form and relative dimensions of the parts and other minor details from those herein shown may be made without departing from the substance of the invention as defined in the appended claims.

I claim:

1. A ball-bearing, comprising inner and outer rings having opposed external and internal grooves or trackways respectively, the sides of one of said grooves being uninterrupted throughout the full height and circumference thereof, one side of the other groove being also uninterrupted throughout its full height and circumference, and the other side of said last named groove having a transverse notch of sufficient depth to admit a ball between said rings when said inner ring, while substantially concentric with said outer ring, is tilted so as to bring the entrance end of said notch opposite a portion of the groove of the other ring, a series of balls between and engaging said grooves, and spacers between said balls.

2. A ball-bearing, comprising an inner ring having an external groove or trackway the sides of which are uninterrupted throughout their full height and circumference, an outer ring having an internal groove or trackway one side wall of which is uninterrupted throughout its full height and circumference, the other side wall of said last-named groove having a transverse notch of sufficient depth to admit a ball between said rings when said inner ring, while substantially concentric with said outer ring, is tilted to bring a portion of its groove opposite the entrance end of said notch, a series of balls between and engaging said grooves, and spacers between said balls.

3. A ball-bearing, comprising an inner ring having an external groove or trackway the sides of which are uninterrupted throughout their full height and circumference, an outer ring having an internal groove or trackway one side wall of which is uninterrupted throughout its full height and circumference, the other side wall of said last named groove having a transverse notch that extends at its inner end to the bottom of the groove and is of sufficient depth to admit a ball between said rings when said inner ring, while substantially concentric with said outer ring, is tilted to bring a portion of its groove opposite the entrance end of said notch, a series of balls between and engaging said grooves, and spacers between said balls.

4. A ball-bearing, comprising an inner ring having an external groove or trackway the sides of which are uninterrupted throughout their full height and circumference, an outer ring having an internal groove or trackway one side wall of which is uninterrupted throughout its full height and circumference, the other side wall of said last named groove having a transverse notch that extends on a curved line from one face of the ring to the bottom of the groove and is of sufficient depth to admit a ball between said rings when said inner ring, while substantially concentric with said outer ring, is tilted to bring a portion of its groove opposite the entrance end of said notch, a series of balls between and engaging said grooves, and spacers between said balls.

5. The herein described method of manufacturing and assembling a ball-bearing into a unitary structure the parts of which hold each other together, which consists in forming outer and inner rings having opposing grooves or trackways the sides of which are uninterrupted throughout their full height and circumference except for a single transverse notch formed through one side of one groove, placing a number of balls (less than the full number of balls used) in the groove of the outer ring, placing the inner ring on said balls substantially concentric with the outer ring, tilting said inner ring relatively to said outer ring to bring the entrance end of said notch opposite a portion of the groove of the other ring, inserting the remaining ball or balls through said notch and restoring said inner ring to the plane of said outer ring, and introducing spacers between the balls to distribute them around the race-way formed by said grooves.

GEORGE W. NORDSTRUM.

Copies of this patent may be obtained for five cents each, by addressing the "Commissioner of Patents, Washington, D. C."